United States Patent [19]

Colten

[11] 4,204,106

[45] May 20, 1980

[54] ELECTRICAL HEATING SYSTEM FOR BUILDING STRUCTURES

[75] Inventor: Jerrold L. Colten, South Bend, Ind.

[73] Assignee: Bristol Products, Inc., Bristol, Ind.

[21] Appl. No.: 1,863

[22] Filed: Jan. 8, 1979

[51] Int. Cl.² ............................................. H05B 1/00
[52] U.S. Cl. .................................................. 219/213
[58] Field of Search .................... 219/213; 165/45, 47, 165/48, 53; 126/400

[56] References Cited

U.S. PATENT DOCUMENTS

| | | | |
|---|---|---|---|
| 2,332,227 | 10/1943 | Jackson | 165/45 X |
| 3,527,921 | 9/1970 | Voglesonger | 219/213 |
| 4,000,851 | 1/1977 | Heilemann | 165/45 X |
| 4,117,305 | 9/1978 | Colten | 219/213 |

FOREIGN PATENT DOCUMENTS

| | | | |
|---|---|---|---|
| 1565202 | 2/1970 | Fed. Rep. of Germany | 219/213 |
| 2351080 | 4/1975 | Fed. Rep. of Germany | 219/213 |
| 366219 | 2/1932 | United Kingdom | 219/213 |

OTHER PUBLICATIONS

J. F. McPartland, Electric Radiant Heating in Floor, Electrical Construction and Maintenance, vol. 69, No. 9, pp. 110-113, 9/70.

*Primary Examiner*—C. L. Albritton
*Attorney, Agent, or Firm*—Marmaduke A. Hobbs

[57] ABSTRACT

An electrical heating system for building structures in which side walls form a space for fill material supporting a slab floor and containing an electrical heating cable, the fill material functioning as a heat sump for absorbing heat while the heating cable is in operation and releasing it over a period of time whether the cable is operating or not. A moisture regulator is included in the system consisting of one or more distribution units connected to a source of water and a probe sensing the amount of moisture for registering on a gauge or for operating a valve in the line for maintaining the desired amount of moisture in the fill material. The fill material may be divided by a plurality of vertical walls into compartments, and a water distributing unit and a moisture sensor probe are disposed in each of the compartments for controlling the moisture in each compartment. A thermal and moisture insulating material is preferably disposed between the fill material and the earth to prevent escape downwardly of the heat generated in the fill material and to assist in controlling the moisture content of the fill material.

14 Claims, 4 Drawing Figures

ELECTRICAL HEATING SYSTEM FOR BUILDING STRUCTURES

A particular type of heating system for homes and other building structures consists of an electrical heating cable buried in sand or other material beneath a concrete slab floor, the material beneath the floor storing the heat generated from time to time by the electrical heating cable, and gradually releasing the heat through the concrete floor throughout the day and night. This type of heating system, which usually provides a rather uniform heat supply to the living space of the building, is generally more economical than the conventional electrical heating system which primarily heats the air in the living space from a centrally located heating unit, or by separate space heating units in the various rooms of the house. The use of the electrical system to heat the material under the floor permits the electrical system to be operated during the hours of low electrical demand from the electric power companies, and to be inoperative or on low output during times of peak demand. Further, conduction of heat from the material below the floor upwardly through the floor dissipates the heat where it is most needed and where it can best be utilized for effective heating of the living space and for optimum comfort of those in the living space.

While the heat storage type system just described has a number of advantages, there are some disadvantages which decrease its efficiency, and hence the acceptance of that type of system in homes where it could otherwise be effectively used. One of the major problems of the foregoing electric heating systems is to maintain sufficient moisture in the fill material to provide optimum conductivity of heat between the particles of sand or other granular material, and between the fill material and the layer forming the slab for the floor of the building structure above the fill material. In the conventional heat sump of the foregoing type, the heat generated by the heating cable will normally drive off the moisture, and the heat transfer efficiency of the fill material consequently decreases and remains indefinitely below optimum performance, thus requiring excessive temperatures in the heating cable to achieve a given level of heat input. It is therefore one of the principal objects of the present invention to provide a heat sump system for building structures, which effectively maintains the moisture in the fill material at a level for optimum efficiency of the heating system, and which can be regulated manually or automatically to supply moisture to the fill material of the system as required for maximum efficiency.

Another object of the invention is to provide a heat sump system which includes a moisture sensing and indicating system for determining the moisture content of the fill material at various locations in the material, and which is capable of supplying moisture selectively to any of the sensed locations having a deficiency of moisture, and further, which substantially improves the performance and efficiency of the aforementioned type of heating system.

Still another object is to provide a heat sump system of the aforesaid type which is simple to construct and operate and virtually service free, and which will give optimum performance over extended periods of time with no attention, and yet is responsive to the heat requirements of the living space above the sump system.

The invention is primarily concerned with a heating system in which an electric heating cable is buried in fill material such as sand, beneath a concrete slab floor. The heating cable, which is preferably about one to three inches in depth, heats the material, which is confined on all lateral sides by retainer walls, normally of concrete, and usually the foundation of the building structure. The present heating system preferably includes a thermal barrier beneath the fill material to eliminate or minimize the loss of heat downwardly into the earth, so that substantially all of the heat generated by the electric heating cable is available for conduction upwardly through the fill material and floor into the living space of the building structure. While the concrete foundation forming the lateral sides of the heat sump serves as a barrier to reduce heat loss between the fill material and the surrounding earth or atmosphere, preferably an additional barrier to both moisture and heat loss is included along the lateral sides, normally along the inside surface of the foundation.

The presence of moisture in the fill material improves the heat conductivity by providing a coupling effect between the grains of sand or other particulated material of the fill material, so that the heat will transfer readily from grain to grain through the moisture which has better conductivity than the air otherwise separating the particles. The heat is also transferred by the flow of the moisture itself in the interstices of the particulate material. While the present system contemplates the use of a barrier both below and around the sides of the fill material, there is likely to be sufficient moisture leakage or non-uniform distribution thereof in the fill material, that the heat transfer may be inefficient or at least substantially less than optimum in performance. The present invention contemplates the maintenance and good distribution of the moisture in the fill material so that maximum efficiency of the system can be maintained.

While a number of objects of the invention have been set forth hereinabove, other objects and advantages of the invention will become apparent from the following description and accompanying drawings, wherein.

Figure 3:
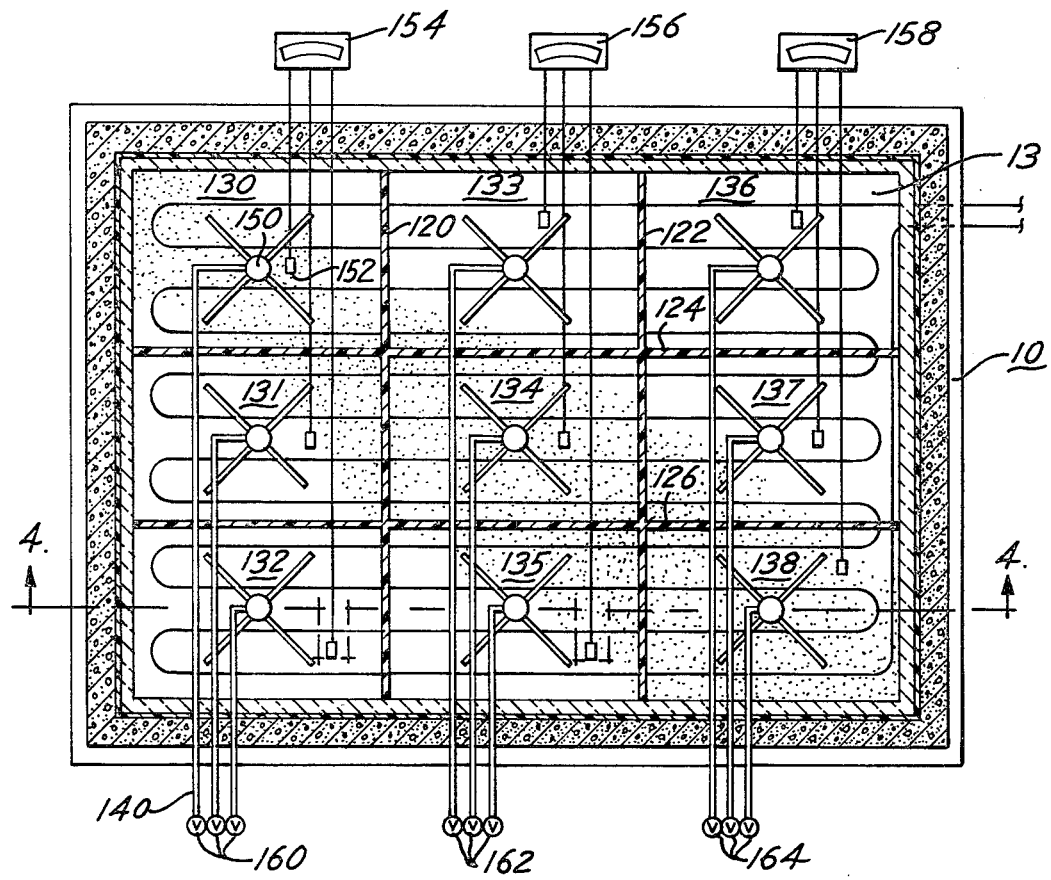
Figure 4:
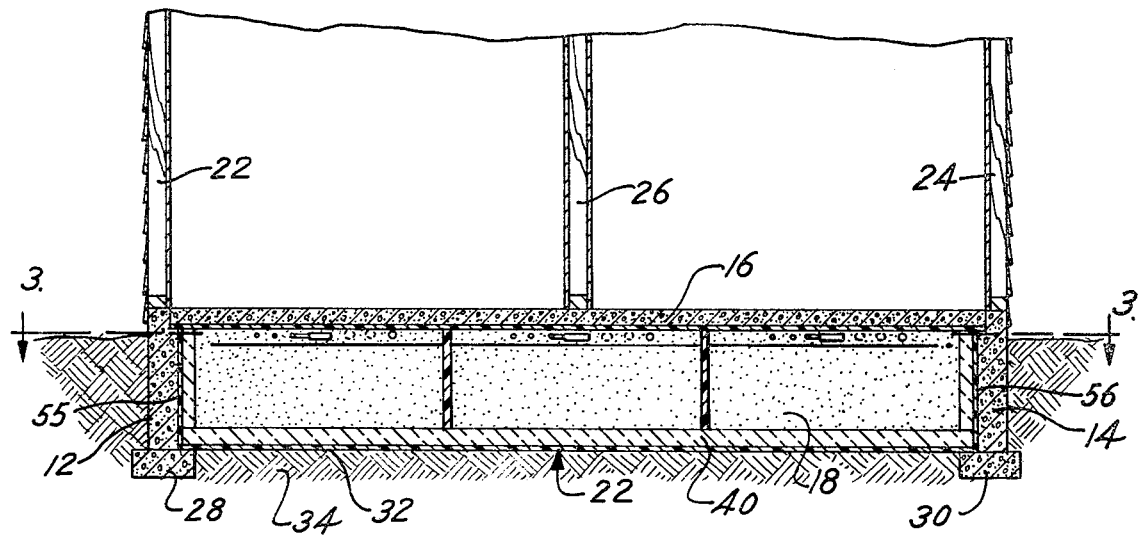

FIG. 3 is a horizontal cross sectional view through the foundation and fill material of the present heating system showing a modified form of the present heating system, the section being taken on line 3—3 of FIG. 4; and FIG. 4 is a vertical cross sectional view of the lower portion of a building structure showing the foundation, footing and the ground surrounding the foundation, and the electrical heating system embedded in the fill material beneath the floor slab in the modified form, the section being taken on line 4—4 of FIG. 3.

Figure 1:
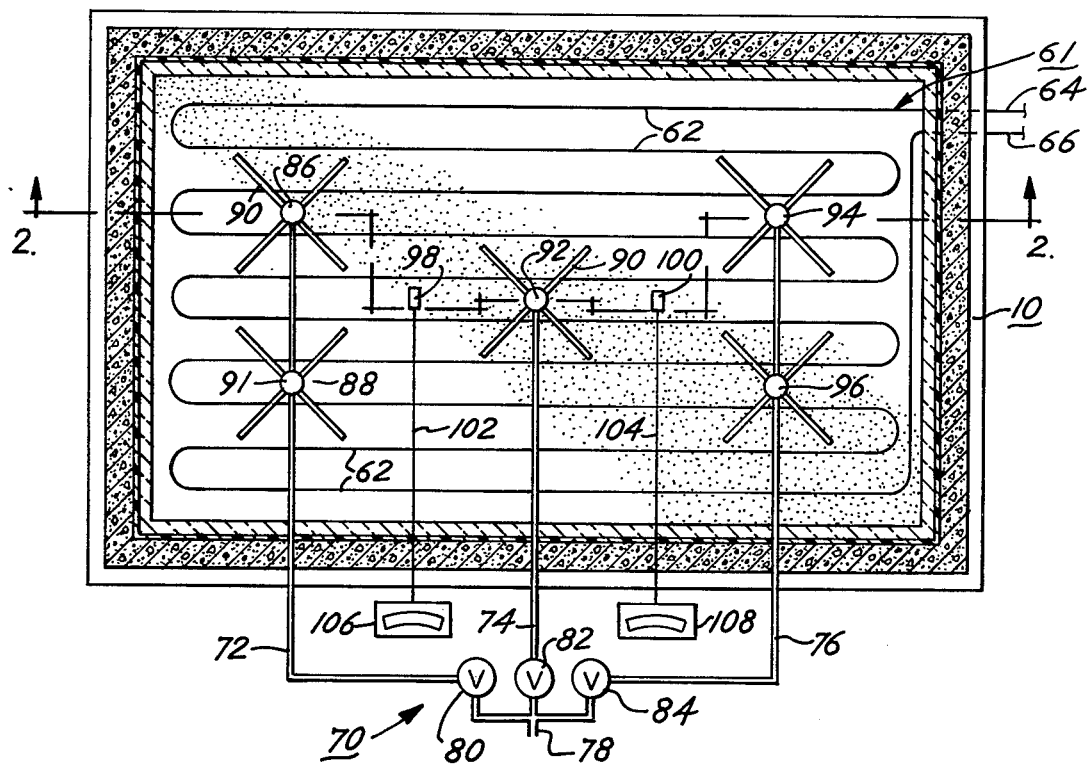
FIG. 1 is a horizontal cross sectional view through a lower portion of a building structure, such as a home, showing the foundation and fill material with the present moisture control system installed in the fill material, the section being taken on line 1—1 of FIG. 2.
Figure 2:
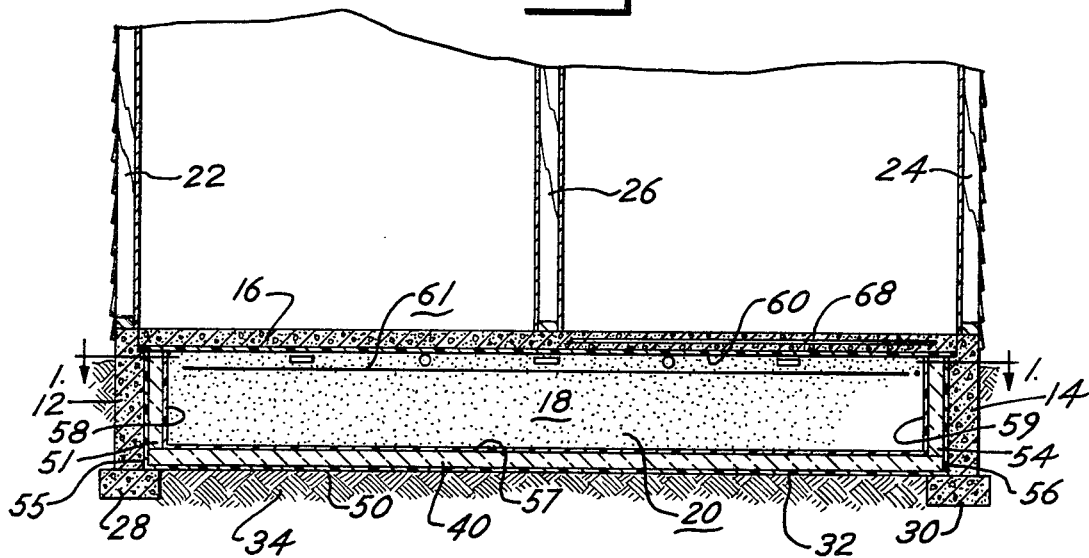
FIG. 2 is a vertical cross sectional view through the lower portion of the building, such as a home, showing the foundation and footings in the ground and the present electrical heating system installed therein with the fill material beneath the concrete floor slab, the secton being taken on line 2—2 of FIG. 1.

Referring more specifically to the drawings, the building structure shown in FIGS. 1 and 2 includes a foundation 10 having vertical side walls 12 and 14, a floor 16 consisting of a concrete slab laid on fill material 18 which forms a part of the heat sump indicated generally by numeral 20. Outside walls 22 and 24 and wall partition 26 of the building are shown supported by the foundation and on the concrete slab. Foundation sides 12 and 14 are supported by footings 28 and 30, respectively, poured in trenches made at the time the excavation for the building is made. For the purpose of the present invention, this construction is considered conventional and will not be described in further detail. The present heating system is adaptable to a variety of different types of buildings, including single and multiple family homes, and commercial and industrial buildings; however, the description herein will be directed primarily to the application of the invention to home structures.

After the excavation for the foundation and heating system 20 has been made down to surface 32 of the earth 34, a layer of thermal insulating material 40 is laid on surface 32. The insulating material may be of a variety of different substances, preferably cellular polyurethane, of sufficient strength to support fill material 18 and concrete slab 16. In any event, the thermal insulating structure must have substantial thickness, preferably at least two to four inches, and be capable of withstanding moisture and not be subject to rot or disintegration under adverse conditions over long periods of time. While the foregoing thermal insulating structures illustrate suitable ways of providing a thermal barrier, other types of thermal insulating structures may be used if they satisfy both the thermal and strength requirements, the thermal characteristic of the material used determining the amount and thickness of the material used. Different types of reinforcement may be required for different insulating materials, to obtain the required strength to support the fill material and slab thereon.

In order to seal the heat sump 20 to assist in retaining the desired level of moisture in the fill material, a plastic sheet 50 is placed beneath the thermal insulating material where it will minimize the flow of moisture between the ground and the fill material. In addition to the thermal insulating material 40, insulating materials 51 and 54 are preferably installed along the inner surface of foundation sides 12 and 14 to minimize the loss of heat through the concrete foundation. Moisture barrier sheets 55 and 56, normally of plastic material, are also preferably disposed between the concrete foundation and the respective thermal barriers, and a sheet is preferably disposed beneath slab 16, to reduce the flow of moisture from the heat sump material, thereby assisting in maintaining the proper moisture level in the material. Plastic sheets 57, 58 and 59 may also be placed above and on the inside of the insulating layers to maintain maximum insulating efficiency as well as to improve the seal around the sump fill material, and a similar sheet 60 may be placed on top of the fill material.

In the embodiment of FIGS. 1 and 2, an electric heating system, indicated generally by numeral 61, consists of a plurality of spaced electric heating cable sections 62, preferably buried between one and six inches beneath the concrete slab. The cable is electrically insulated and waterproof and has cold leads 64 and 66. In the embodiment illustrated in the drawings, the thickness of the fill material 18 is approximately 28 inches, with the electric heating cable being disposed approximately five inches from the bottom of the slab. In order to assist in laying the cable, it may be mounted on a carrier, the carrier and cable assembly normally being fabricated in a plant and rolled for shipping and then unrolled onto the surface of the partially filled fill material in the excavation. An additional heating cable or cable 68 in place of cable 61 may be buried in the floor slab as illustrated in FIG. 2.

In order to maintain the moisture in the fill material at the optimum level, a water distribution system indicated generally by numeral 70 is embedded in the fill material, preferably near the top of the material, as can best be seen in FIG. 2. In the embodiment illustrated in FIG. 1, three water lines 72, 74 and 76 are connected to a source of water, such as a municipal water supply system, by a pipe 78, and each of the lines contains valves 80, 82 and 84 for controlling the flow of water through the respective lines. In this embodiment, line 72 is connected to water distribution units 86 and 88 which distribute the water through a plurality of perforated tubes 90, extending radially from head 91 and having a sufficient number of holes that the water is effectively distributed by the tubes. The two units with the water distributing arms are so located that a substantial portion of the fill material will be penetrated by the water delivered to the two units. Line 74 is connected to a unit 92 having a plurality of perforated radially extending tubes 90 for supplying water to the center of the fill material. Line 76 is connected to units 94 and 96 of similar construction to units 86, 88 and 92 for supplying moisture to the respective end of the fill material. The number of units on a line or the number of units with separate lines will be determined by the length of the radial tubes of the units used. A single unit could be used under some conditions with a configuration of radial arms or tubes branching from a single line to provide even distribution of water to the fill material. In the embodiment illustrated, moisture sensing probes 98 and 100 are connected by leads 102 and 104 to gauges 106 and 108, respectively, for indicating the amount of moisture in the fill material so that an operator can operate any one or all of the valves to provide the proper amount of moisture to the fill material as indicated by the gauges. In place of gauges, the probes may be connected to a control which automatically turns on and turns off the various valves to maintain the proper moisture content in the bed without the supervision of an operator.

In the operation of the installation illustrated in FIGS. 1 and 2, the electrical heating system, containing the foregoing moisture regulating system, is operated as required to provide the desired temperature in the living space above; however, the heat sump may be most economically operated by heating the fill material at off peak periods of electrical demand at the power company, to store the heat for gradual release from the fill material through the concrete slab into the living space. Since the cable is disposed at least several inches below the concrete floor, a relatively slow response from the electrical system is obtained, in that a period of time is required for the heat to flow from the electric heating cable through the fill material and concrete slab into the living space thereabove. However, an effective, prolonged heat release is obtained from this type of system, so that a relatively even heat is obtained from the heat sump through the concrete slab floor. From time to time the moisture injection system 70 may be used either manually or automatically to control the amount of moisture in the fill dirt. Whenever additional moisture is required in any location in the fill material, one or more of the three valves 80, 82 and 84 are turned on to supply water to the area or areas low in moisture content.

With reference to the embodiment disclosed in FIGS. 3 and 4, a plurality of partitions 120 and 122 extending in one direction across the fill material and partitions 124 and 126 extending at right angles to the other partitions divide the fill material into a plurality of compartments, indicated by numerals 130 through 138. The compartments are connected by water lines, indicated generally by numeral 140, to a source of supply such as a city water system and to units 150 in each compartment. The units 150 are similar in construction and operation to units 86 and 88 previously described herein. A probe 152 is disposed in each compartment and is connected to one of the gauges 154, 156 and 158. When moisture is indicated for one of the compartments, the corresponding valve, indicated generally by numerals 160, 162 and 164, is opened, either manually or automatically, to supply the water to that compartment and raise the moisture content in the fill material in the respective compartment to the desired amount. The partitions 120, 122, 124 and 126 may be of various materials, preferably of plastic, and preferably extend from the bottom to the top of the fill material and are substantially water impervious so that the moisture will not flow readily from one compartment to another. Thus, with the compartmented structure of the fill material, the moisture can effectively be controlled throughout the entire area so that the heat is transmitted to and through the slab substantially uniformly over its entire area. In some instances where there tends to be a cold area in the building, such as in a corner, the moisture content in the compartment beneath the area can be controlled to provide a variation in temperature in that area. The combination of the compartment heating and moisture control results in effective regulation of the heat in any area throughout the living space above the concrete slab floor.

While only two embodiments of the present electrical heating system for building structures have been described in detail herein, various changes and modifications may be made without departing from the scope of the invention.

I claim:

1. A heating system for building structures, comprising side walls defining an inner area with earth disposed beneath said area and supporting said side walls, heat absorbing and releasing fill material substantially filling said area and having an upper surface, means for sensing the amount of moisture in said fill material, a water distribution means disposed in said fill material, a line connecting said water distribution means to a source of water, a slab forming a floor of the building structure supported by said fill material on said upper surface forming a heat exchanging relationship with said fill material, and an electrical heating cable in thermal communication with said fill material for heating said fill material.

2. A heating system for building structures as defined in claim 1 in which a thermal insulating layer is disposed between said fill material and the earth therebeneath for minimizing the loss of heat from said fill material into the earth.

3. A heating system for building structures as defined in claims 1 or 2 in which a plurality of partitions divide said fill material into a plurality of compartments, and each of said compartments has a water distribution means in the fill material therein.

4. A heating system for building structures as defined in claim 3 in which a moisture sensing means is disposed in each of said compartments and a lead for each sensing means transmits a signal indicating the amount of moisture in the respective compartments.

5. A heating system for building structures as defined in claims 1 or 2 in which said electrical cable is disposed in said fill material in spaced relation with respect to the top and bottom of said fill material.

6. A heating system for building structures as defined in claim 3 in which said electrical cable is disposed in said fill material in spaced relation with respect to the top and bottom of said fill material.

7. A heating system for building structures as defined in claims 1 or 2 in which a layer of sheet material is disposed between said fill material and the earth.

8. A heating system for building structures as defined in claim 3 in which a layer of sheet material is disposed between said fill material and the earth.

9. A heating system for building structures as defined in claim 2 in which said insulating layer is at least two inches in thickness and is substantially impervious to moisture.

10. A heating system for building structures as defined in claims 1 or 2 in which a layer of heat insulating material is disposed along the inner surface of said side walls.

11. A heating system for building structures as defined in claim 10 in which said layer of heat insulating material along the side walls is also substantially impervious to moisture.

12. A heating system for building structures as defined in claim 1 in which a moisture impervious sheet is disposed along the bottom, sides and top of said fill material.

13. A heating system for building structures as defined in claims 1 or 2 in which said cable is disposed in said floor.

14. A heating system for building structures as defined in claim 3 in which said cable is disposed in said floor.

* * * * *